United States Patent [19]

Seki et al.

[11] Patent Number: 5,602,835
[45] Date of Patent: Feb. 11, 1997

[54] OFDM SYNCHRONIZATION DEMODULATION CIRCUIT

[75] Inventors: Takashi Seki; Yasushi Sugita; Tatsuya Ishikawa, all of Kanagawa-ken, Japan

[73] Assignee: Kabushiki Kaisha Toshiba, Kawasaki, Japan

[21] Appl. No.: 341,976

[22] Filed: Nov. 16, 1994

[30] Foreign Application Priority Data

Nov. 16, 1993 [JP] Japan .................................. 5-287056

[51] Int. Cl.$^6$ ...................................... H04L 7/00
[52] U.S. Cl. ..................... 370/206; 370/517; 375/324; 375/362
[58] Field of Search .................... 375/220, 219, 375/324, 327, 362, 254, 316, 364, 325, 326; 370/18, 19–23, 69.1, 100.1, 108, 105.2, 105.3

[56] References Cited

U.S. PATENT DOCUMENTS

| | | | |
|---|---|---|---|
| 5,134,634 | 7/1992 | Yoshida | 375/324 |
| 5,206,886 | 4/1993 | Bingham | 455/258 |
| 5,228,062 | 7/1993 | Bingham | 375/344 |
| 5,311,550 | 5/1994 | Fouche et al. | 370/19 |
| 5,313,169 | 5/1994 | Fouche et al. | 375/334 |
| 5,313,497 | 5/1994 | Sadot et al. | 375/346 |
| 5,371,761 | 12/1994 | Daffara et al. | 375/1 |

FOREIGN PATENT DOCUMENTS

| | | |
|---|---|---|
| 0365431A1 | 4/1990 | European Pat. Off. . |
| 0453203A2 | 10/1991 | European Pat. Off. . |
| WO92/10043 | 6/1992 | WIPO . |

OTHER PUBLICATIONS

Monnier et al., "Digital Television Broadcasting With High Spectral Efficiency", International Broadcasting Convention Proceedings, No. 358, pp. 380–384, Jul. 1992.

Le Floch et al., "Digital Sound Broadcasting to Mobile Receivers", IEEE Transactions on Consumer Electronics, vol. 35, No. 3, pp. 493–503, Aug. 1989.

Daffara et al., "Maximum Likelihood Frequency Detectors for Orthogonal Multicarrier Systems"; IEEE International Conference on Communicatoins '93, May 23–26, 1993, Geneva Switzerland, Proceeding of the International Conference on Communications (ICC).

*Primary Examiner*—Alpus H. Hsu
*Assistant Examiner*—Seema S. Rao
*Attorney, Agent, or Firm*—Cushman, Darby & Cushman IP Group of Pillsbury Madison & Sutro LLP

[57] ABSTRACT

An OFDM synchronization demodulation circuit includes a recovery circuit, an orthogonal axis demodulation circuit, a first and second delay circuit, a correlation calculation circuit, a guard timing detection circuit, and an OFDM signal demodulation circuit. The receiving circuit receives an orthogonal modulated wave based on an orthogonal frequency division multiplex (OFDM) modulated signal having an available symbol period and a guard period, where the guard period of the orthogonal modulated wave is based on a part of the available symbol period. The orthogonal axes demodulation circuit demodulates an in-phase axis detection signal and an orthogonal axis detection signal for the OFDM modulated wave from the receiving circuit using orthogonal detection. The first delay circuit delays the in-phase axis detection signal by the available symbol period, and the second delay circuit delays the orthogonal axis detection signal by the available symbol period. The correlation calculation circuit calculates coefficients of the correlations of the in-phase axis detection signal and the orthogonal axis detection signal from the orthogonal demodulation circuit with the output of the first or the second delay circuits. The guard timing detection circuit detects a timing of the guard period in the demodulation outputs from the orthogonal demodulation circuit. The OFDM signal demodulation circuit demodulates the OFDM modulated signal by extracting the available symbol period signal only from the demodulated output of the orthogonal demodulation circuit using the timing signal.

8 Claims, 13 Drawing Sheets

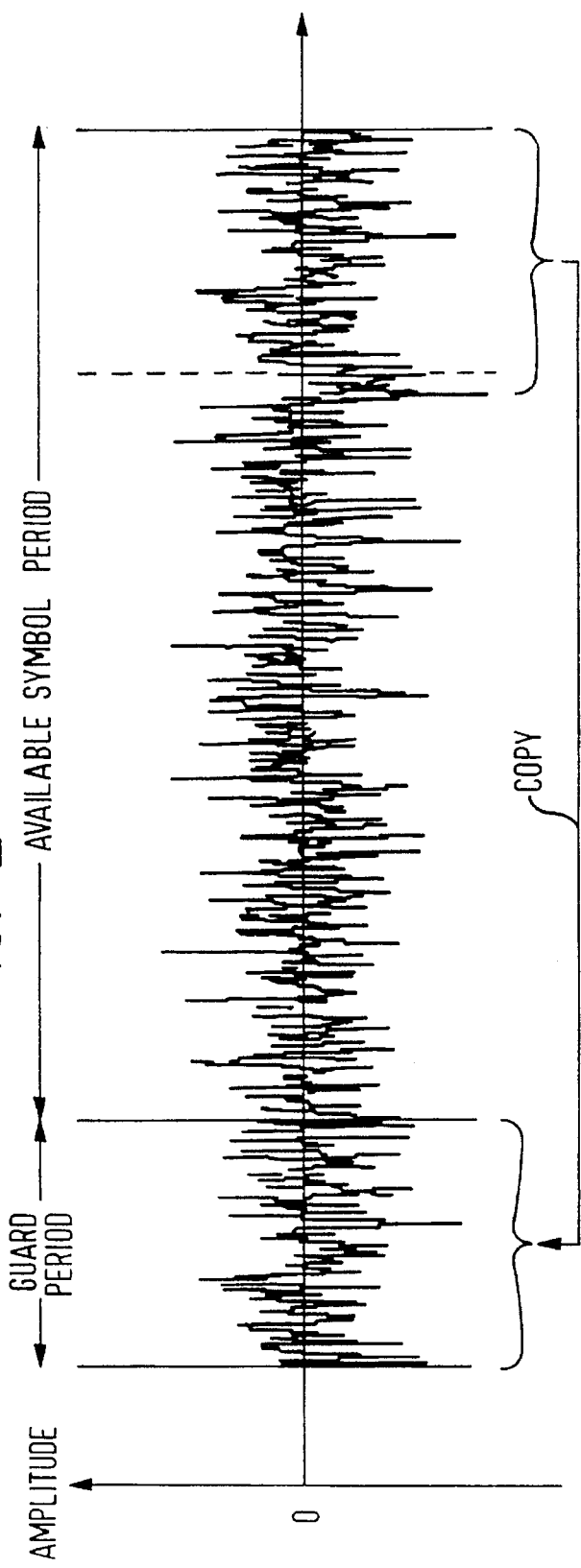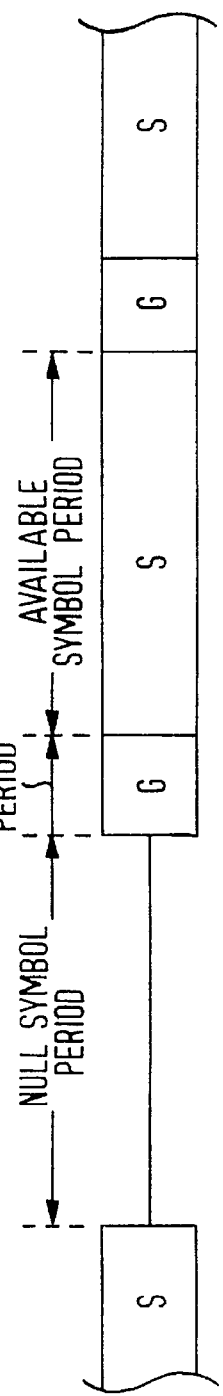

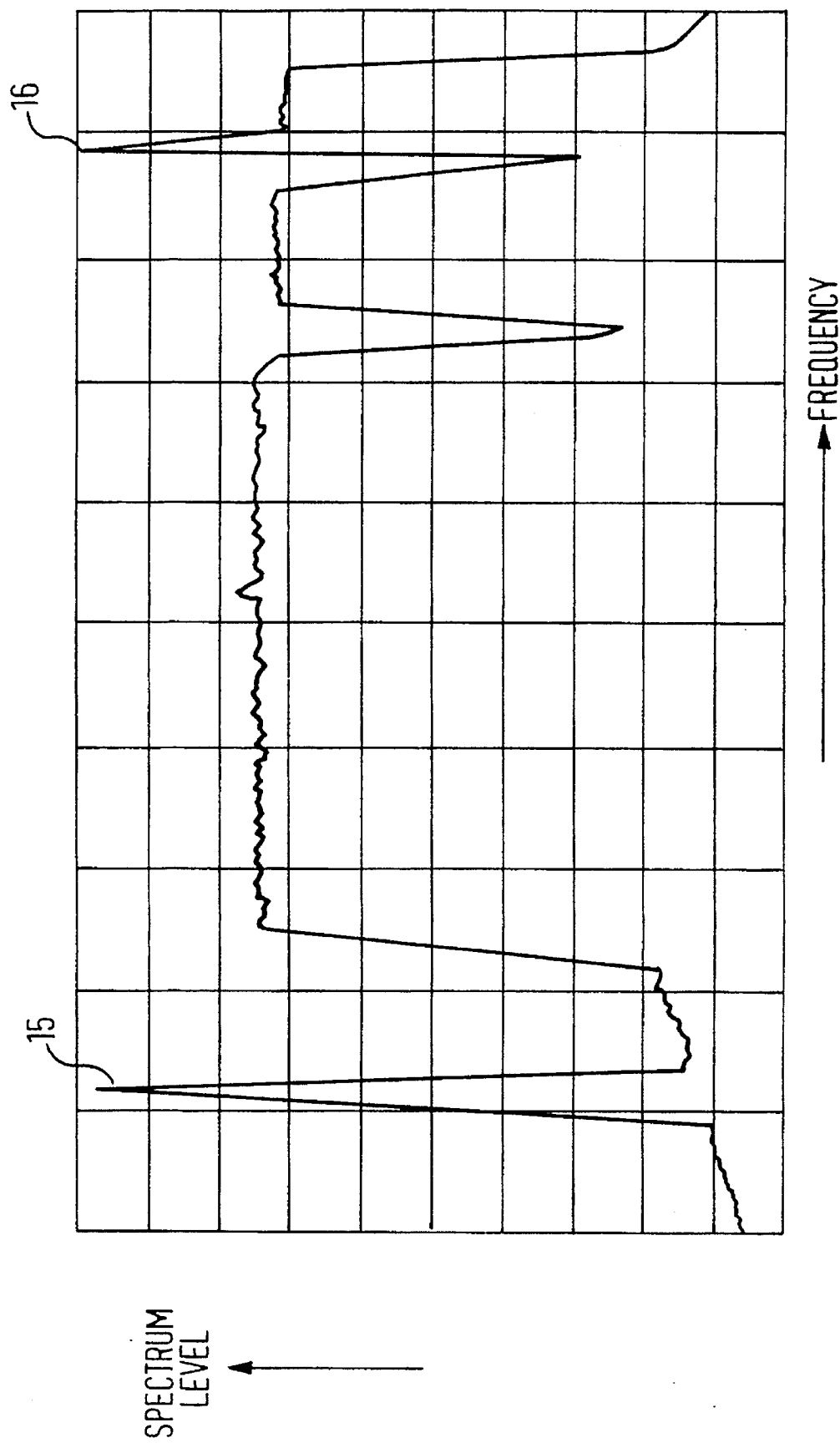

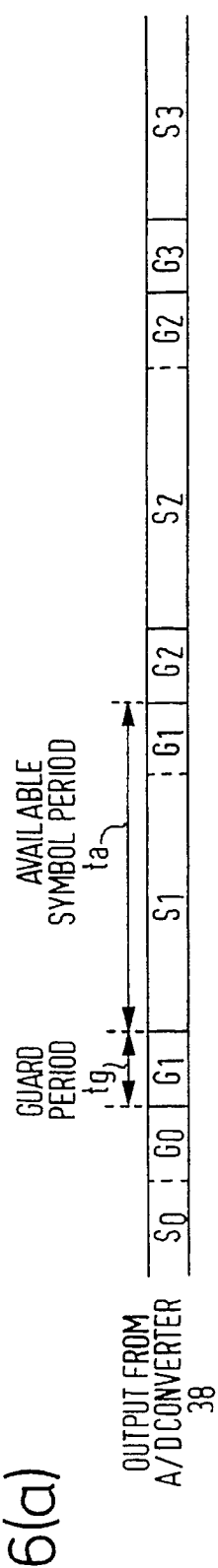
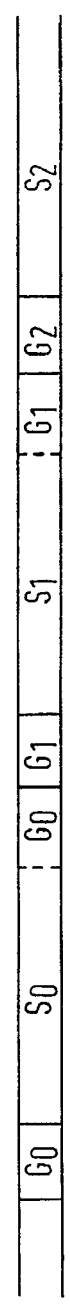
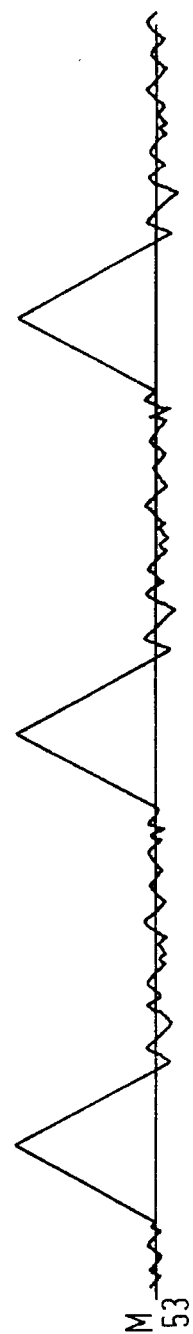
FIG. 6(a) OUTPUT FROM A/D CONVERTER 38
FIG. 6(b) OUTPUT FROM DELAY 51
FIG. 6(c) OUTPUT FROM CORRELATOR 53
FIG. 6(d) GUARD TIMING
FIG. 6(e) GUARD PERIOD REMOVING GATE PULSE

OFDM SYNCHRONIZATION DEMODULATION CIRCUIT

FIELD OF THE INVENTION

The present invention relates to an OFDM synchronization demodulation circuit, and more particular to an OFDM synchronization demodulation circuit which obtains symbol synchronization and carrier synchronization from information derived from the signals themselves without requiring pilot carriers or special reference signals (i.e., synchs).

BACKGROUND OF THE INVENTION

With digitization in broadcasting or mobile radio communication, a digital modulation system has been developed in recent years. In particular, in the mobile radio communication, orthogonal frequency division multiplex (hereinafter referred to as OFDM) modulation, which is durable against multipass interference, has been under examination for adoption. OFDM modulation is a system for distributing transmitted digital data on multiple carriers (hereinafter referred to as subcarriers) which are mutually orthogonal and for modulating the digital data transmitted on each carrier. OFDM modulation is advantageous in that the frequency utilization factor is high, it hardly supplies disturbance to other digital data transmitted on surrounding carriers, and it is virtually free from the effect of multiple path interference.

FIG. 1 is a block diagram showing a conventional OFDM modulator/demodulator.

Transmitted data such as a QPSK modulated or QAM modulated signal is input through an input terminal 1. The transmitted data is supplied to a serial/parallel converter 3 of an OFDM modulator 2, where the data is converted into low speed parallel data comprising multiple symbols. The number of symbols per parallel data coincides with the number of sub-carriers. An inverse fast Fourier transform (hereinafter referred to as IFFT) circuit 4 modulates between several hundred and several thousand mutually orthogonal sub-carriers. The number of sub-carriers is set according to a number of using points of the IFFT circuit 4. The transmitted data which has been OFDM modulated by the IFFT circuit 4 is supplied to a parallel/serial converter 5 where it is converted into serial data and supplied to a guard period adding circuit 6. The guard period adding circuit 6 adds a guard period to the serial data in order to prevent the multiple path interference and outputs the data to a transmission line (not shown).

FIG. 2 is a typical waveform diagram showing the transmitted data along with a guard period.

As the transmitted data is modulated after distributed into several hundreds or thousands of sub-carriers in the OFDM modulation system, the modulation symbol rate of sub-carriers becomes extremely low and the period per symbol become extremely long. Consequently, the transmitted data is hardly subject to delays caused by reflecting waves. Further, the effect of multiple path interference can be eliminated effectively by placing a guard period in front of the available symbol period. A guard period adding circuit 6 provides a guard period which replicates a latter half of a corresponding available symbol period as shown in FIG. 2. If the delay time of multiple path interference is within the guard period, it is possible to prevent inter-symbol interference resulting from delayed adjacent symbols by limiting demodulation of the available symbol period signal to the time of demodulation.

In the OFDM demodulation circuit 7, data received from a transmission line (not shown) is supplied to a guard period removing circuit 8. The guard period removing circuit 8 extracts signals in the available symbol period from the received data, and supplies the extracted signals to a serial/parallel converter 9. The serial/parallel converter 9 converts serial data into parallel data for every sub-carrier, and outputs the converted parallel data to a fast Fourier transform (hereinafter referred to a FFT) circuit 10. The FFT circuit 10 demodulates sub-carriers through the FFT operation. The demodulated signal output from FFT circuit 10 is converted into serial data by a parallel/serial converter 11 and is output as received data.

In order for FFT circuit 10 to execute accurate demodulation, it is necessary to obtain a timing synchronization (hereinafter referred to as the symbol synchronization) of the available symbol period. Therefore, as transmission data is transmitted after orthogonal modulation, a carrier synchronization must be obtained at a receiver section for the proper orthogonal demodulation. Because the OFDM modulated wave shown in FIG. 2 is a waveform similar to random noise, it is difficult to obtain symbol synchronization and carrier synchronization based on the OFDM modulated wave.

Therefore, conventional OFDM synchronization demodulation circuit add a separate reference signal to attain symbol synchronization (see CCIR Rec. 774). FIG. 3 is an explanatory diagram for explaining such a conventional symbol synchronization method.

As described above, a guard period has been added to the transmitted data. That is, as shown in FIG. 3, transmitted data corresponding to each symbol includes both available symbol period S and guard period G. Further, a non-signal period (hereinafter referred to as the null symbol period) for symbol synchronization is added for every several tens of symbol periods. By detecting the null symbol period contained in transmitted data, it is possible to obtain the symbol synchronization at the demodulator section. That is, by detecting a demarcation timing between the null symbol period and the guard period from a modulated wave envelope, the available symbol period timing is obtained.

FIG. 4 is a graph for explaining a carrier synchronization method of another conventional OFDM synchronization demodulation circuit which has been described in "Summary of OFDM Experiments done by the ARTC". In FIG. 4, frequency is plotted on the X-axis and amplitude of a spectrum plotted on the Y-axis. The central frequency band of FIG. 4 indicates sub-carriers modulated by transmitted data. Sub-carriers at both sides of the frequency band are not modulated, but are instead used as pilot carriers 15 and 16. At the demodulator section, carrier synchronization is attained by detecting the pilot carriers.

However, a method for executing symbol synchronization based on cyclically transmitted null symbols may be inaccurate because null symbols may be disturbed and erroneously detected. When null periods go undetected or if they are spaced too far apart, the normal demodulating operation is not carried out for a long time, until next null symbol was detected in this case. If null symbols are sent frequently to solve the problem, transmission efficiency drops. Further, in a method for executing the carrier synchronization using pilot carriers, carrier synchronization cannot be attained if pilot carriers are disturbed.

In case of a conventional OFDM synchronization demodulation circuit as described above, the normal demodulation operation is inhibited since symbol synchronization is not achieved when a null symbol added to transmitted data is disturbed. In addition, no carrier synchronization is attained if pilot carriers are disturbed.

SUMMARY OF THE INVENTION

It is therefore an object of the present invention to provide an OFDM synchronization demodulation circuit and method which is capable of executing symbol synchronization and carrier synchronization from transmitted information signals alone.

In order to achieve the above object, an OFDM synchronization demodulation circuit according to one embodiment of the present invention includes a receiving circuit for receiving an orthogonal modulated wave of an orthogonal frequency division multiplex (OFDM) modulated signal having an available symbol period and a guard period that is based on a part of the available symbol period, an orthogonal axes demodulation circuit for demodulating an in-phase axis detection signal and an orthogonal axis detection signal of the received OFDM modulated wave, a first delay circuit for delaying the in-phase axis detection signal by the available symbol period, a second delay circuit for delaying the orthogonal axis detection signal by the available symbol period, a correlation calculation circuit for calculating correlation coefficients based on correlations of at least one of the in-phase axis detection signal and the orthogonal axis detection signal both with an output of the first delaying circuit and with an output of the second delaying circuit, respectively, a guard timing detection circuit for detecting a timing of the guard period based on the correlation coefficients and for generating a timing signal based on the timing detecting, and an OFDM signal demodulation circuit for demodulating the OFDM modulated signal by extracting only the available symbol period signal from the demodulated in-phase axis detection signal and the orthogonal axis detection signal based on the timing signal.

Further, an OFDM synchronization demodulation circuit according to another embodiment of the present invention includes a receiving circuit for receiving an orthogonal modulated wave of an orthogonal frequency division multiplex (OFDM) modulated signal having an available symbol period and a guard period that coincides with a part of the available symbol period, an orthogonal axes demodulation circuit for demodulating an in-phase axis detection signal and an orthogonal axis detection signal of the received OFDM modulated waves, a first delay circuit for delaying the in-phase axis detection signal by the available symbol period, a second delay circuit for delaying the orthogonal axis detection signal by the available symbol period, a correlation calculation circuit for calculating correlation coefficients based on correlations of at least one of the in-phase axis detection signal and the orthogonal axis detection signal both with an output of the first delaying circuit and with an output of the second delaying circuit, an OFDM signal demodulation circuit for demodulating the OFDM modulated signal by extracting only the available symbol period signal from the in-phase axis detection signal and the orthogonal axis detection signal, a frequency deviation detection circuit for detecting a frequency deviation of the orthogonal axes demodulation circuit based on the correlation coefficient calculated by the correlation calculation circuit, and a frequency control circuit for controlling detection frequency of the orthogonal axes demodulation circuit based on the frequency deviation. The invention also includes methods corresponding to the first and second embodiment.

In the OFDM synchronization demodulation circuit according to the present invention, as the guard period of the orthogonal frequency division multiplex modulated signal is identical to a part of the available symbol period signal, when delaying amounts of the first and the second delaying circuits are set based on the available symbol period, the in-phase axis detection signal and the orthogonal axis detection signal from the orthogonal axes demodulation circuits are correlative with the outputs of the first and the second delaying circuits, respectively, if a detected frequency is proper. Further, even when the detected frequency is deviated, the in-phase axis detection signal and the orthogonal axis detection signal are correlative with the outputs of the second and the first delaying circuits, respectively. In the OFDM synchronization demodulation circuit of the first embodiment, the guard timing detection circuit detects the guard period timing based on the result of correlation and the demodulating circuit performs the demodulation by extracting the symbol period signal based on the timing signal. In the OFDM synchronization demodulation circuit of the second embodiment described previously, the frequency deviation detection circuit detects a detection frequency deviation of the orthogonal demodulating circuit based on the result of correlation. The carrier synchronization is attained by controlling detection frequency using the detection frequency deviation.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a waveform diagram showing the OFDM modulated signal in a conventional example;

FIG. 3 is an explanatory diagram for explaining the symbol synchronization in a conventional example; and FIG. 4 is a graph for explaining the carrier synchronization in a conventional example;

FIGS. 6(a) through 6(e) are timing charts for explaining the symbol synchronization detection block shown in FIG. 5;

DESCRIPTION OF THE PREFERRED EMBODIMENTS

Figure 1:
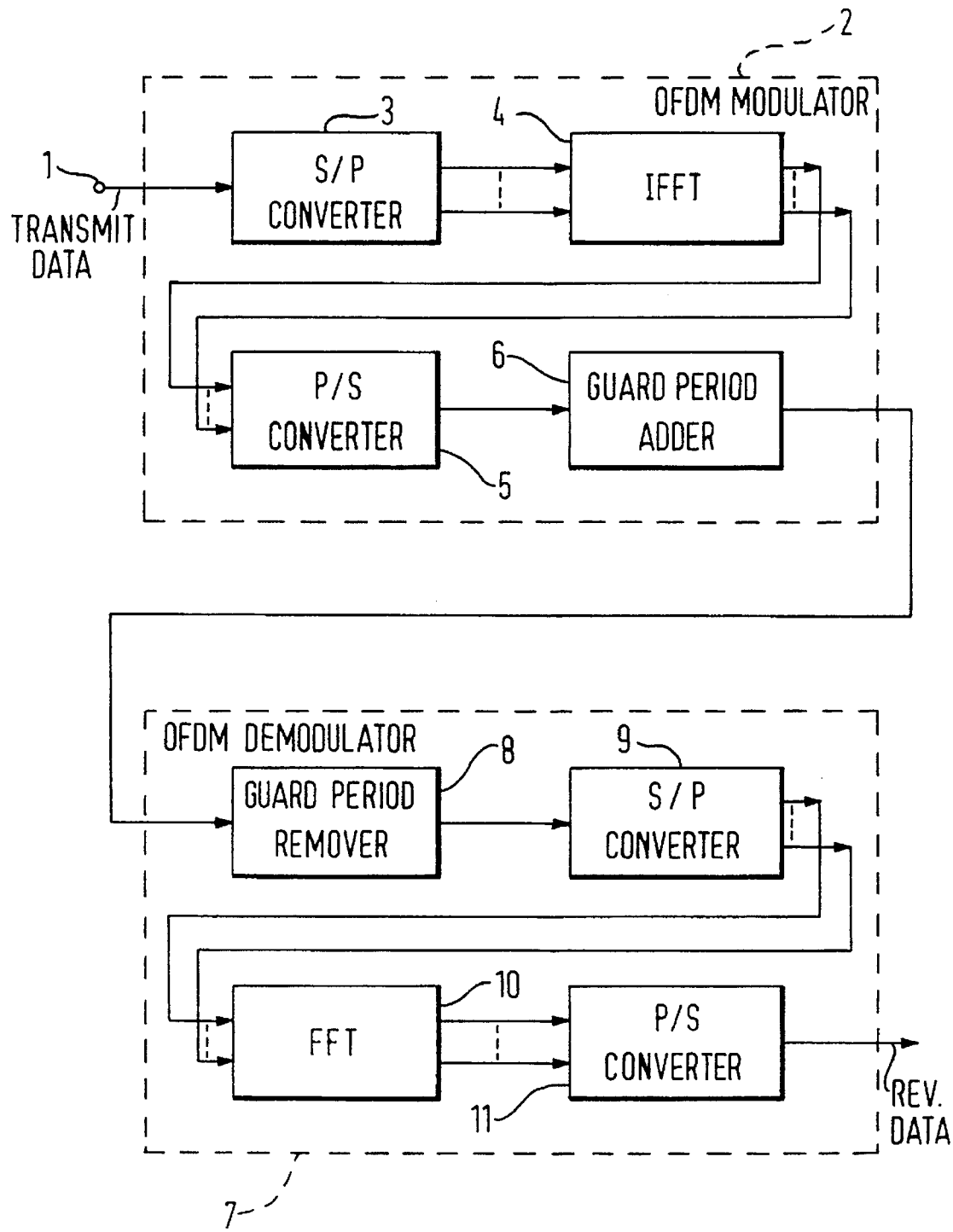
FIG. 1 is a block diagram showing a conventional OFDM modulator/demodulator.

The present invention will be described in detail with reference to FIGS. 5 through 15. Throughout the drawings, like or equivalent reference numerals or letters will be used to designate like or equivalent elements for simplicity of explanation.

Figure 5:
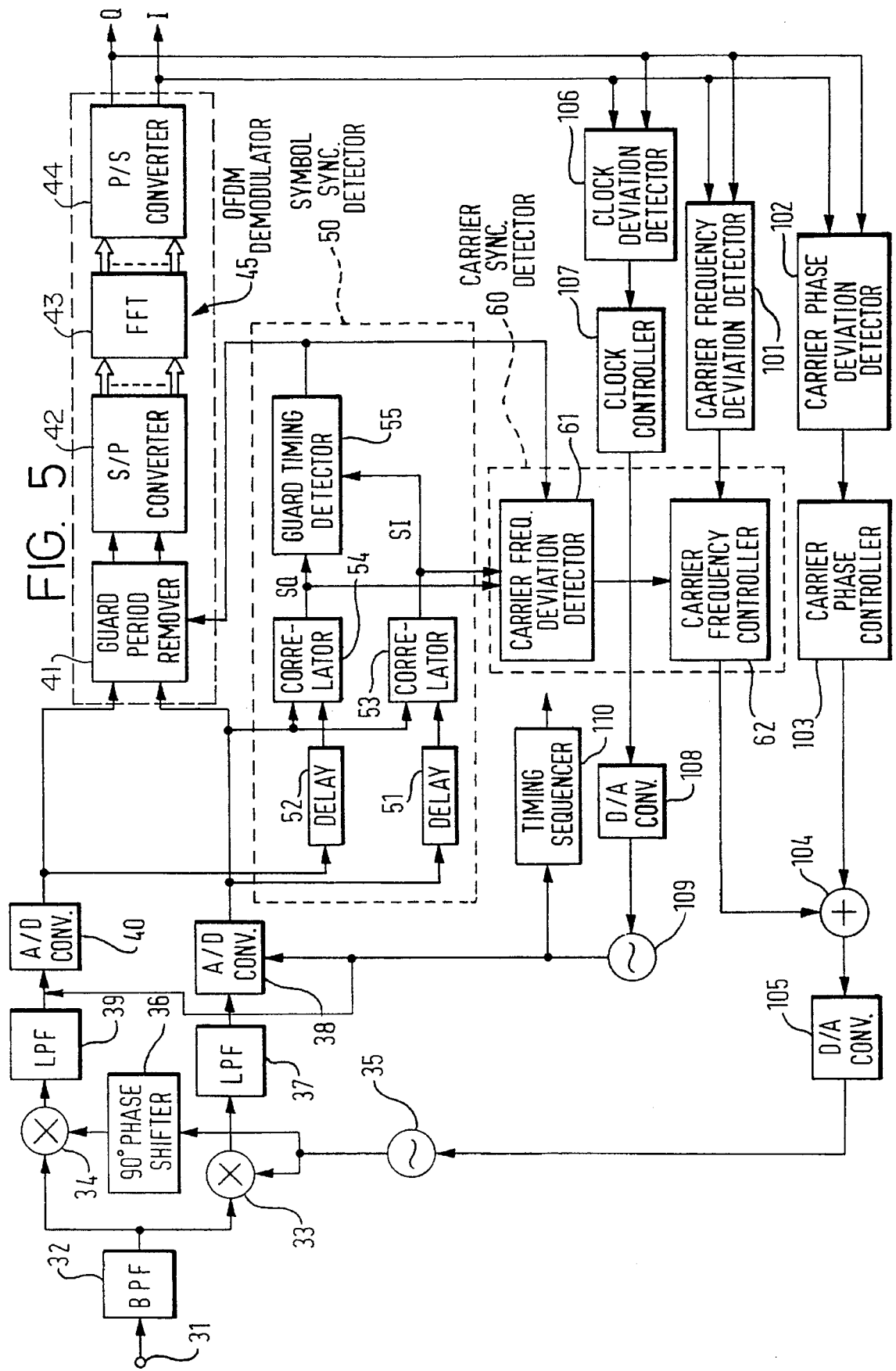
FIG. 5 is a block diagram showing one embodiment of the OFDM synchronization demodulation circuit according to the present invention.

Referring now to FIG. 5, a first embodiment of the OFDM synchronization demodulation circuit according to the present invention will be described in detail. FIG. 5 is a block diagram showing the embodiment of the OFDM synchronization demodulation circuit.

An OFDM modulated signal is received by a tuner (not shown) and converted into intermediate frequency band signal (hereinafter referred to as IF signal) and input to an input terminal 31. The OFDM modulated signal input to the input terminal 31 is, for instance, a QAM signal which was OFDM modulated and orthogonal modulated by specific carriers at a transmitter section before being transmitted. The QAM signal is capable of expressing symbols within two forms of data, I-data corresponding to the real part of a complex form signal, and Q-data corresponding to the imaginary part of the complex form signal. The transmitted OFDM modulated signal does not have a null symbol period as shown in FIG. 3, nor does it have a pilot carrier as shown in FIG. 4. The IF signal is supplied to a bandpass filter (hereinafter referred to as BPF) 32, which removes noise outside the passing band and outputs the IF signal to multipliers 33 and 34.

Oscillation output frequency (restored carrier) of a local oscillator 35 is controlled by a control signal from a D/A converter 105 (described later) and is output to multiplier 33 and to multiplier 34 via phase shifter 36. Phase shifter 36 obtains Q-axis local oscillation output by shifting the local oscillation output (I-axis local oscillation output) by 90°. Multipliers 33 and 34 perform the orthogonal detection by multiplying the I-axis or Q-axis local oscillation output by the IF signal. The in-phase axis detection output (I-signal) from the multiplier 33 is applied to an A/D converter 38 via a low-pass filter (hereinafter referred to as LPF) 37. The orthogonal axis detection output (Q-signal) from the multiplier 34 is applied to an A/D converter 40 via an LPF 39. LPFs 37, 39 remove harmonic components of the I-signal or Q-signal, respectively. The A/D converters 38, 40 each receive an operational clock from a local oscillator 109 (described later), convert an input signal into a digital signal, and output the digital signal to a guard period removing circuit 41 of an OFDM demodulator section 45.

The OFDM demodulator section 45 has a structure similar to OFDM demodulator 7 shown in FIG. 1. It is comprised of a guard period removing circuit 41, a serial/parallel conversion circuit 42, an FFT circuit 43, and a parallel/serial conversion circuit 44. The guard period removing circuit 41 is supplied with a guard timing signal from a guard timing detection circuit 55 (described later). It removes the guard period of OFDM modulated signals (I-signal, Q-signal), extracts an available symbol period signal, and outputs the OFDM modulated signal to the serial/parallel conversion circuit 42. The serial/parallel conversion circuit 42 converts serial data into parallel data and outputs the parallel data to the FFT circuit 43.

The FFT circuit performs an FFT process based on the I-signal and the Q-signal which comprise the real part and the imaginary part of the complex form signal, respectively. Through the FFT process, the synchronization demodulation of each sub-carrier is executed. That is, the real part and the imaginary part of the complex form signal output become the I-data and the Q-data which are demodulated symbols of each sub-carrier, respectively. The I-data and Q-data are supplied to the parallel/serial conversion circuit 44, which in turn generates outputs by converting them into serial data.

In the present invention, the outputs of the A/D converters 38, 40 are also supplied to a symbol synchronization detection block 50. FIGS. 6(a) through 6(e) are timing charts for explaining the symbol synchronization detection block 50 shown in FIG. 5. FIG. 6(a) shows the output of the A/D converter 38. FIG. 6(b) shows the output of a delay circuit 51. FIG. 6(c) shows the output of a correlator 53. FIG. 6(d) shows the guard timing. FIG. 6(e) shows the guard removing gate pulse.

The symbol synchronization detection block 50 is comprised of the delay circuits 51, 52, the correlators 53, 54, and the guard timing detection circuit 55. The delay circuits 51, 52 output the I-signal and the Q-signal to the correlators 53, 54 by delaying them by an available symbol period ts. The I-signal from the A/D converter 38 is also input to the correlators 53, 54. The correlator 53 obtains a correlation coefficient based on a correlation between the I-signal and the delayed I-signal at a gate width of the guard period, and the correlator 54 obtains a correlation coefficient based on a correlation between the I-signal and the delayed Q-signal.

As described above, the OFDM modulated signal is added with the guard periods G1, G2, ... at the leading section of the available symbol periods S1, S2, ... (See FIG. 6(a)). The guard periods G1, G2, ... are copied terminal periods G1', G2', ... of the available symbol period S1, S2, ... Therefore, if the I-signal from the A/D converter 38 is delayed by the available symbol period, the timings of the guard periods G1, G2, ... coincide with the timings of the terminating periods G1', G2', ... Because the guard period signal is a copied terminal end signal during the period, the I-signal and its delayed signal are highly correlated. Because the I-signal is a noisy signal during the other periods (FIG. 2), the correlation of the I-signal with its delay signal is small during those periods. Therefore, a correlation coefficient from the correlator 53 becomes gradually high from the start timing of the terminating periods G1, G2, ... and reaches the peak at the end timing of the terminating period.

Figure 7A:
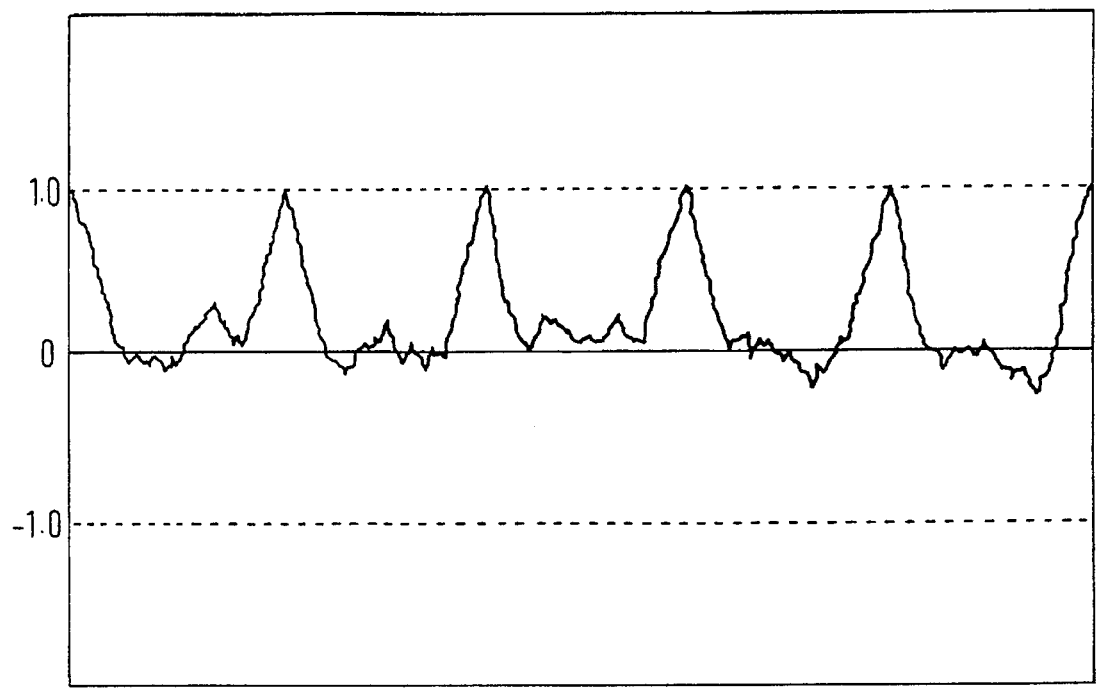
FIGS. 7(a) and 7(b) are graphs for explaining the symbol synchronization detection block shown in FIG. 5.

A correlation coefficient SI from the correlator 53 is supplied to the guard timing detection circuit 55. The guard timing detection circuit 55 detects the peak timing, as shown in FIG. 6(c), and outputs the peak timing to the guard period removing circuit 41 as the guard timing signal (FIG. 6(d)). The guard period removing circuit 41 generates a guard removing gate pulse (FIG. 6(e)) based on the guard timing signal and removes the guard period based on the gate pulse. In addition, the correlation coefficient shown in FIG. 6(c) is at an ideal demodulation when the carrier synchronization has been attained. On the other hand, if carrier synchronization is not attained, the phase of the demodulated output in the orthogonal demodulation rotates to prevent the correlation coefficient from becoming high, even during the terminating period. FIGS. 7(a) through 10 are graphs showning correlation coefficients obtained from the correlators 53, 54 through the simulation with times plotted at the X-axis and normalized correlation coefficient at the Y-axis. FIGS. 7(a), 8(a) and 9(a) show the correlation coefficient SI between the I-signal and its delayed signal, while FIGS. 7(b), 8(b) and 9(b) show the correlation coefficient SQ between the I-signal and the delayed signal of the Q-signal.

Figure 7B:
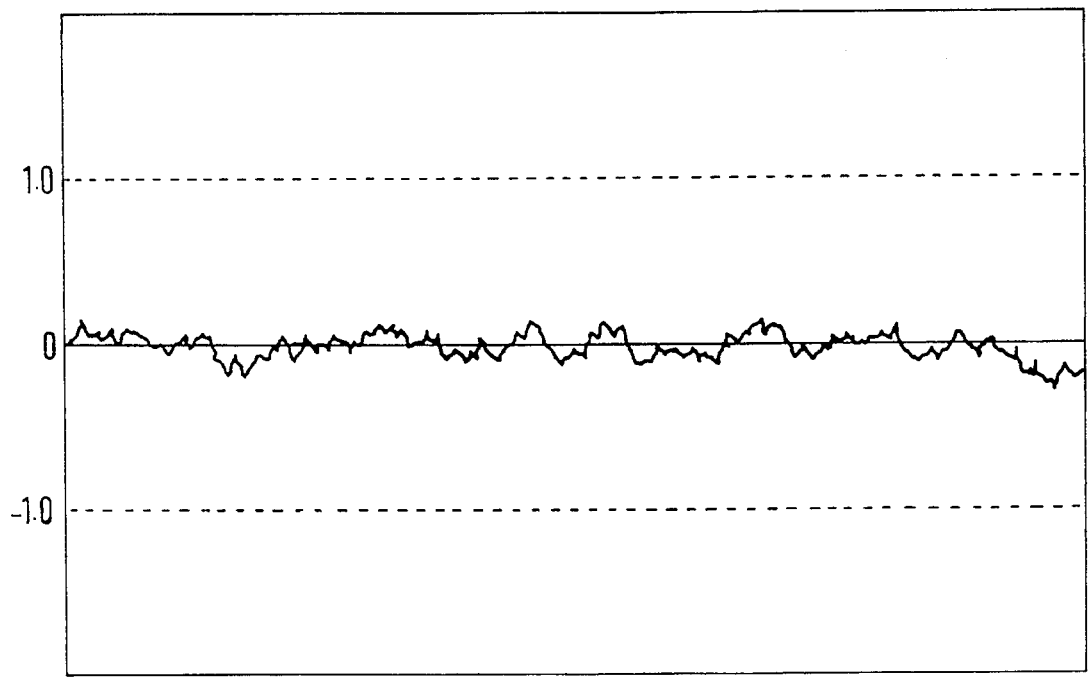
Figure 8A:
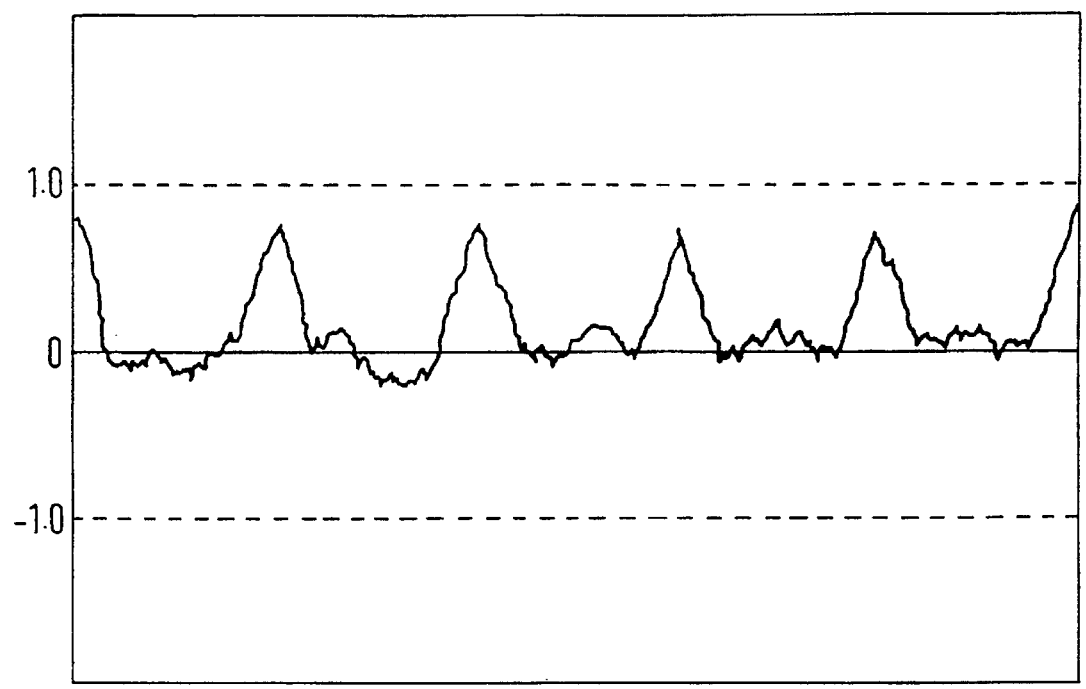
FIGS. 8(a) and 8(b) are graphs for explaining the symbol synchronization detection block shown in FIG. 5.

FIGS. 7(a) and 7(b) show an example in a case where the carrier synchronization is attained. That is, frequency deviation Δf between the local oscillation frequency (restored carrier frequency) from the local oscillator 35 and carrier frequency is zero (0). In this case, the correlation coefficient SI reaches the peak at the end timing of the terminating period G1', G2'..., as shown in FIG. 7(a). The I-signal and the Q-signal are signals having phases that deviate by 90° on the complex plane. Because these signals have not been correlated with each other, the correlation coefficient SQ between the I-signal and the delayed signal of the Q-signal becomes a value near zero (0) as shown in FIG. 7(b).

Figure 8B:
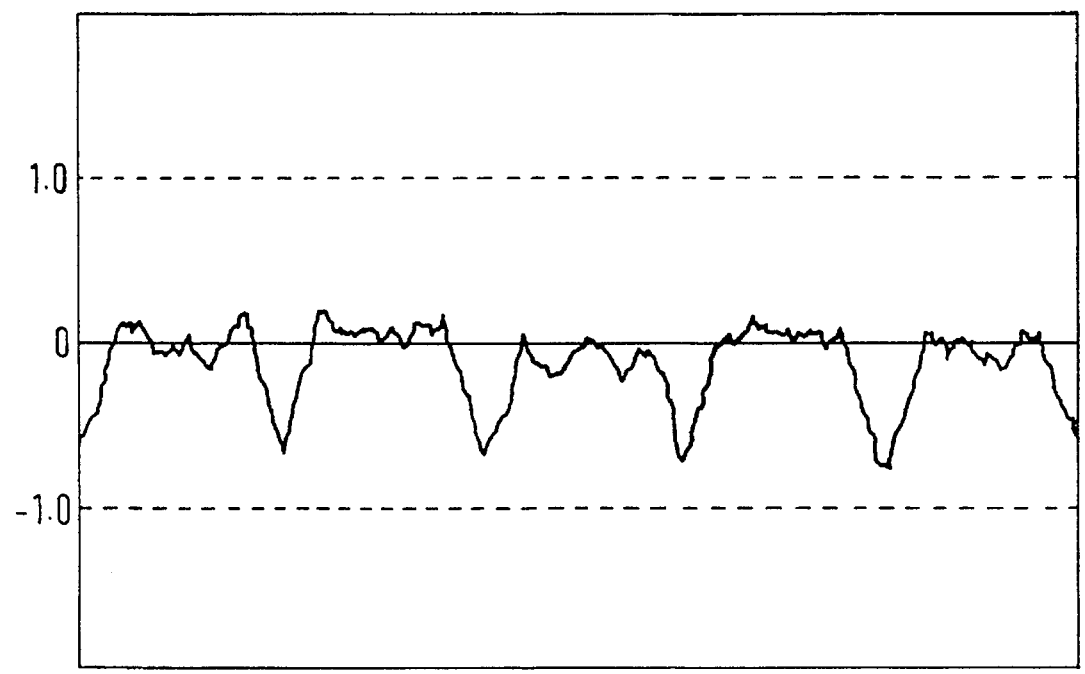
Figure 9A:
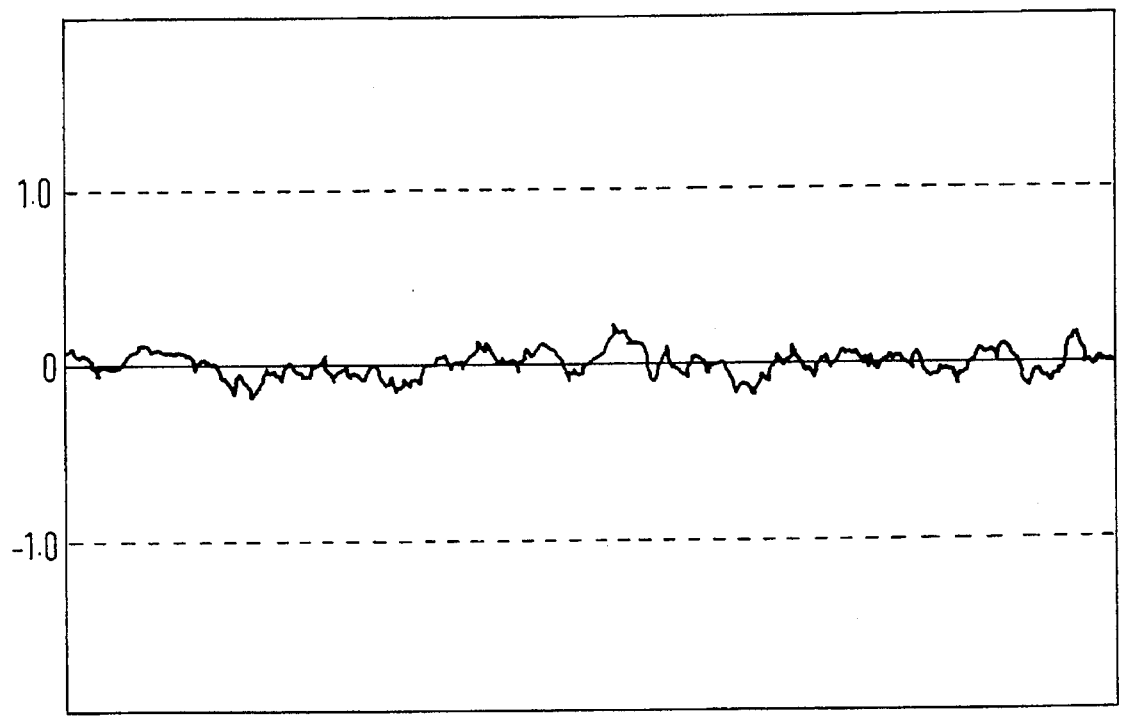
FIGS. 9(a) and 9(b) are graphs for explaining the symbol synchronization detection block shown in FIG. 5.

FIGS. 8(a) and 8(b) show an example in a case where the carrier frequency deviation Δf is fs/8 (fs is a frequency difference between adjacent sub-carriers). In this case, as the phase rotates by 45° in time ts, the phase of signal G' advances by 45° more than signal G. Consequently, as shown in FIG. 8(a), the peak value of the correlation coefficient will become smaller than the peak value obtained during carrier synchronization. Further as shown in FIG. 8(b), the correlation is generated between the I-signal and the delayed signal of the Q-signal, and the correlation coefficient SQ drops to a lower level from the terminating period to reach a negative peak at the end timing of the terminating period.

Figure 9B:
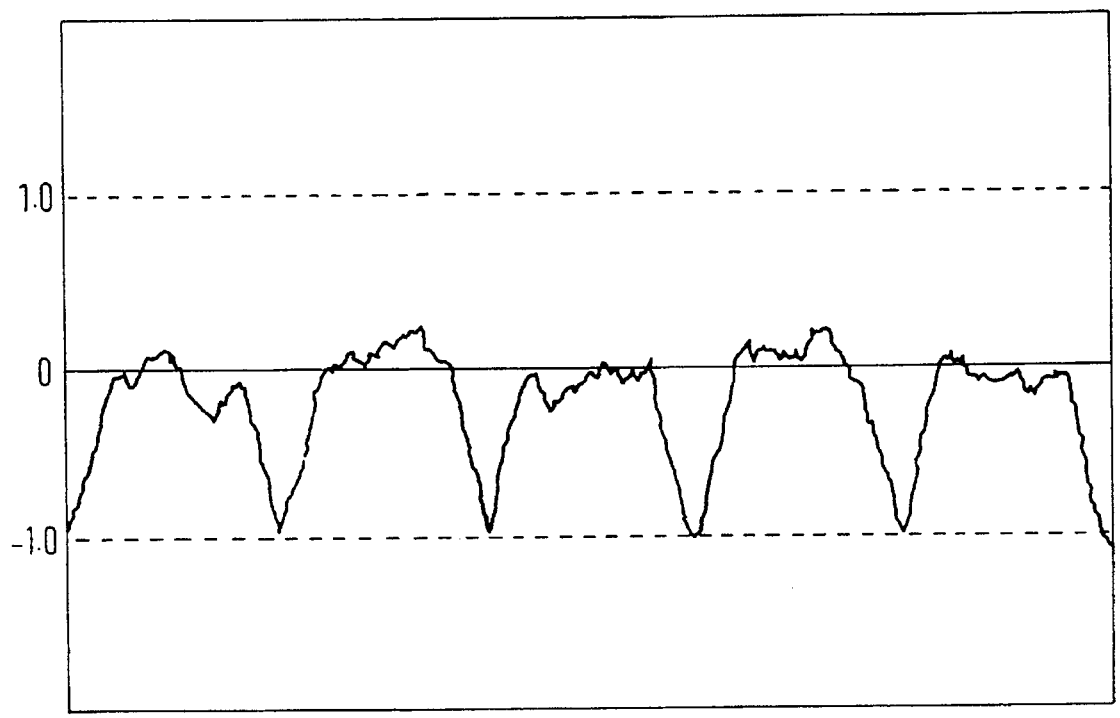

FIGS. 9(a) and 9(b) show an example of a case where a carrier frequency deviation Δf is fs/4. In this case, as the phase rotates by 90° at a time ts, the phase of signal G' advances 90° more than signal G. Therefore, the correlation coefficient SI will become a value near zero (0) as shown in FIG. 9(a), and the efficient of correlation coefficient SQ reaches the negative peak at the end timing of the terminating period, as shown in FIG. 9(b).

As shown in FIGS. 7(a) through 9(b), the end timing of the terminating period can be determined based on correlation coefficients SI, SQ even when no carrier synchronization is attained. For this reason, the correlator 54 obtains the correlation coefficient SQ of the I-signal with the delayed signal of the Q-signal, and outputs that correlation coefficient SQ to the guard timing detection circuit 55.

Figure 11:
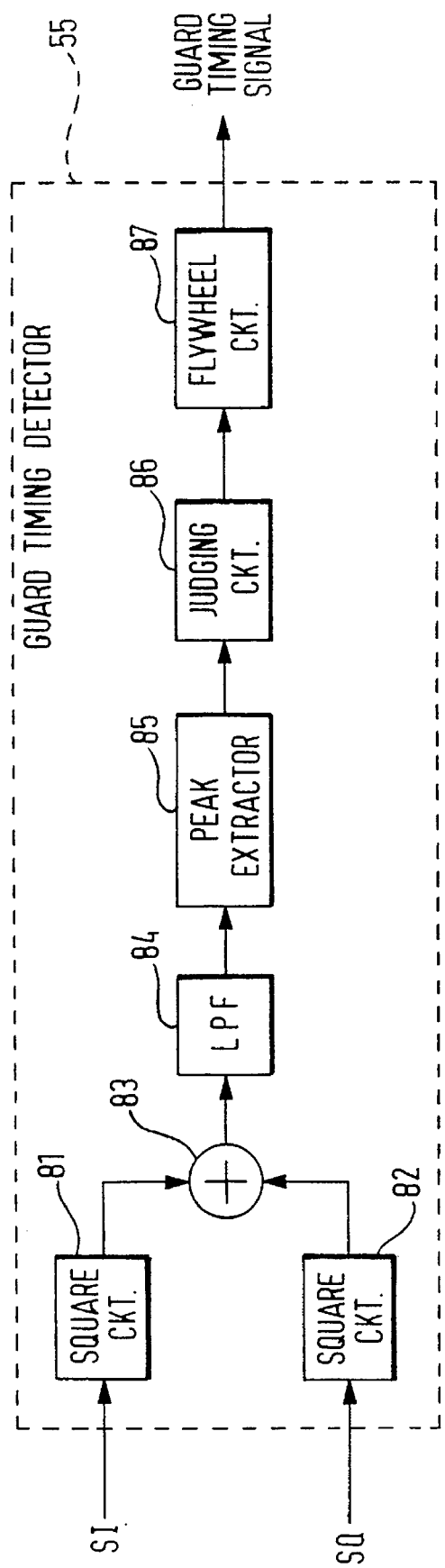
FIG. 11 is a block diagram showing the definite construction of the guard timing detection circuit.

FIG. 11 is a block diagram showing the definite structure of the guard timing detection circuit 55 of FIG. 5. In FIG. 11, the correlation coefficients SI and SQ are supplied to square circuits 81 and 82, respectively. The square circuits 81 and 82 square the correlation coefficients SI and SQ, respectively, and output the results to an adder 83. The adder 83 adds up the outputs of the square circuits 81, 82 and supplies the result to an LPF 84.

Figure 10:
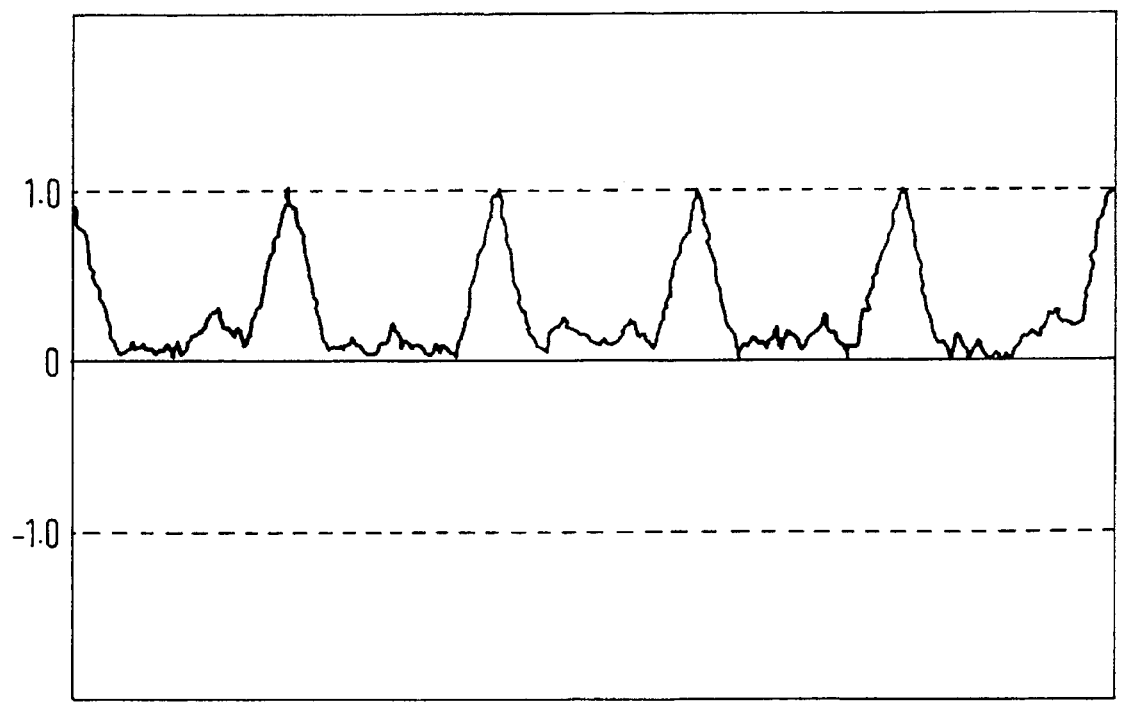
FIG. 10 is a graph for explaining the symbol synchronization detection block shown in FIG. 5.

FIG. 10 is graph showing the arithmetic operating result when no carrier synchronization was attained. As shown in FIG. 10, if the correlation coefficients SI, SQ are squared and added, the added result will reach a peak value at the end timing of the terminating period without depending on a frequency deviation Δf. The LPF 84 smoothes the output of the adder 83 and supplies it to a peak extraction circuit 85. The peak extraction circuit 85 extracts the signal having an amplitude above a specific level, and outputs the result to a judging circuit 86. The judging circuit 86 detects a peak position from the result of extraction of the peak extraction circuit and outputs a timing signal corresponding to the peak position. The timing signal is supplied to a flywheel circuit 87. The flywheel circuit 87 is reset by the timing signal from the judging circuit 86, and outputs a guard timing signal of a fixed cycle based on the timing signal cycle.

Figure 12:
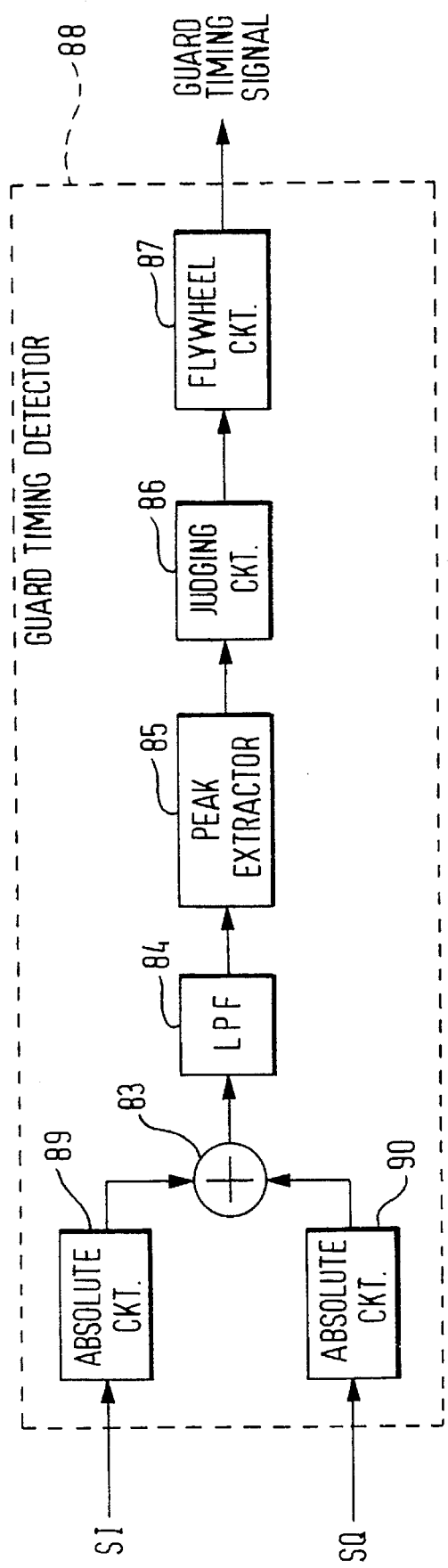
FIG. 12 is a block diagram showing another example of the guard timing detection circuit.

FIG. 12 is a block diagram showing another example the guard timing detection circuit. In FIG. 12, the component elements identical to those shown in FIG. 11, are assigned with the same reference numerals. Thus, explanation of these elements will be omitted.

In FIG. 12, absolute value circuits 89, 90 replace square circuits 81, 82. The peak position is detectable from the result of adding absolute values of the correlation coefficients SI, SQ, and the guard timing signal can be obtained even when the guard timing detection circuit 88 of FIG. 12 is used.

Further, in this embodiment, the correlation coefficients SI, SQ from the correlators 53, 54 are supplied to a carrier synchronization detection block 60. The carrier synchronization detection block 60 is comprised of a carrier frequency deviation detection circuit 61 and a carrier frequency control circuit 62 (see FIG. 5).

Figure 13:
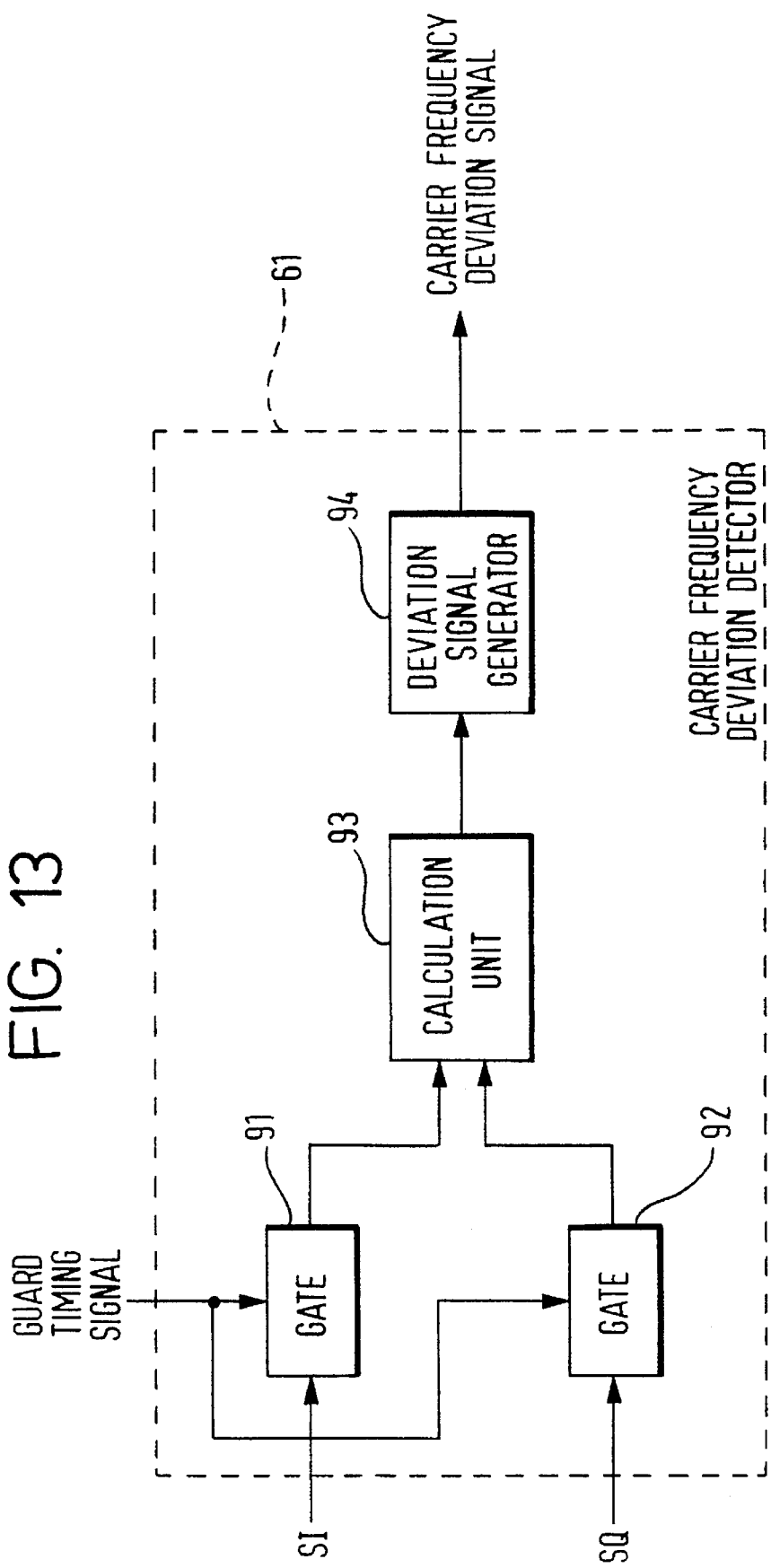
FIG. 13 is a block diagram showing the definite construction of the carrier frequency deviation detection circuit shown in FIG. 5.
Figure 14A:
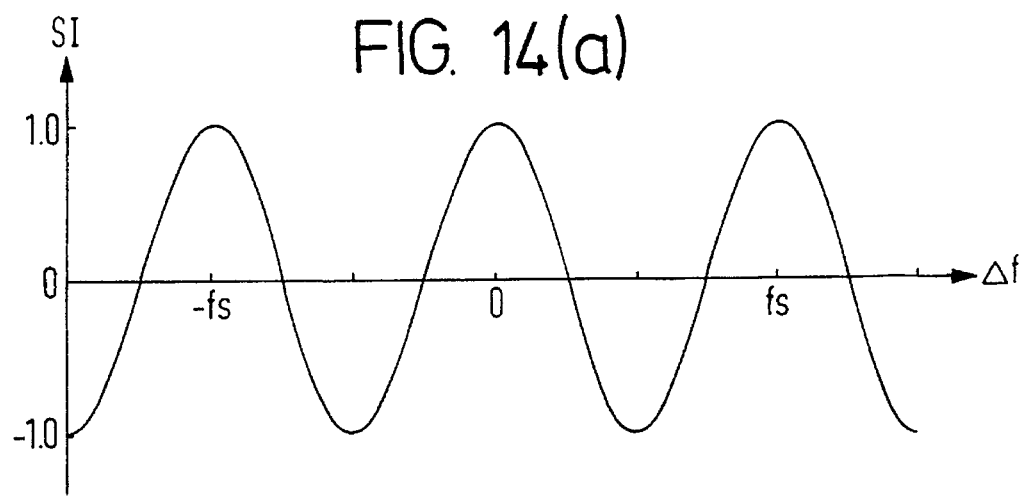
FIGS. 14(a), 14(b) and 14(c) are graphs for explaining the carrier synchronization detection block shown in FIG. 5.
Figure 14B:
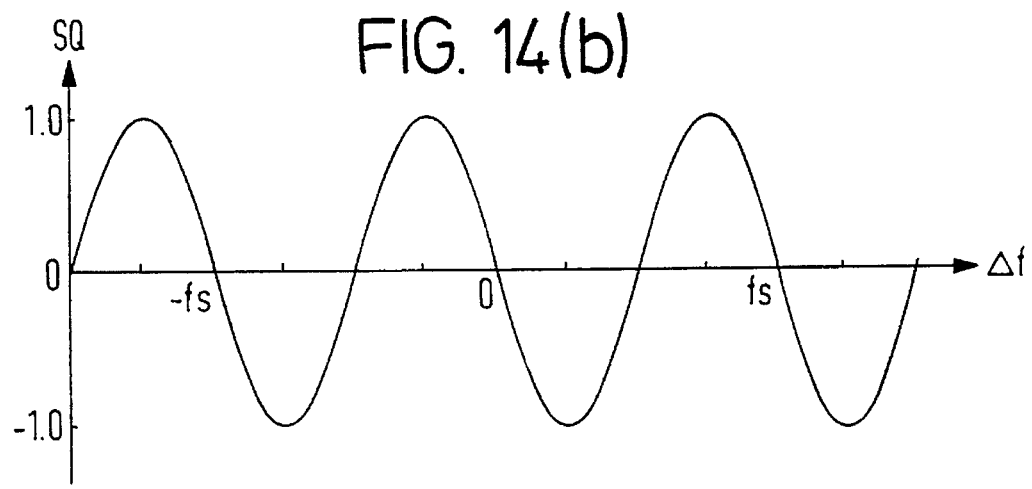
Figure 14C:
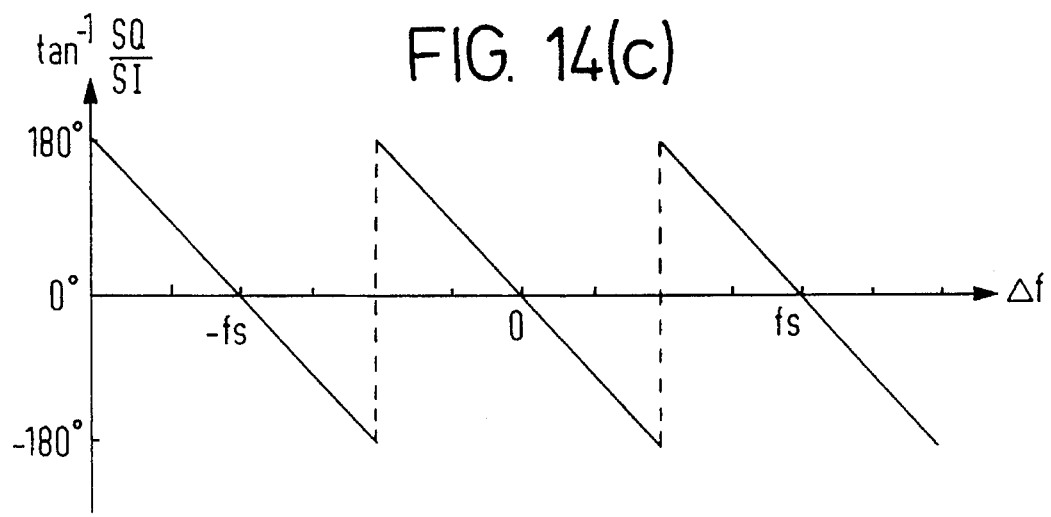

FIG. 13 is a block diagram showing the definite structure of the carrier frequency deviation detection circuit 61, as shown in FIG. 5. Further, FIGS. 14(a), 14(b) and 14(c) are graphs for explaining the carrier frequency deviation detection circuit shown in FIG. 13. FIG. 14(a), 14(b) and 14(c) show the relation of the correlation coefficients SI and SQ at the guard timing by plotting carrier frequency deviation Δf at the X-axis and normalized correlation coefficients SI and SQ, respectively, or by plotting an arc tangent SQ/SI at the Y-axis.

In FIG. 13, the correlation coefficients SI and SQ are input to gates 91 and 92 of the carrier frequency deviation detection circuit 61, respectively. Gates 91 and 92 output the correlation coefficients SI and SQ to a calculation unit 93 based on the timing of the guard timing signal. The calculation unit 93 obtains an arc tangent of the correlation coefficient SQ/SI and outputs it to a frequency deviation signal generation circuit 94. As described above, the correlation coefficients SI, SQ change according to the carrier frequency deviation Δf. However, as shown in FIGS. 14(a) and 14(b), the change in the correlation coefficients SI, SQ at the guard timing has regularity as it becomes a function of the carrier frequency deviation Δf. If the calculation unit 93 obtains an arc tangent of the correlation coefficient SQ/SI, cross signals at the carrier frequency deviation Δf=±fs, ±2fs, ... are obtained as shown in FIG. 14(c). The frequency deviation signal generating circuit 94 uses a signal, as shown in FIG. 14(c), as the carrier frequency deviation signal in order to control carrier frequency. Based on the carrier frequency deviation signal generated, it becomes possible to adjust and synchronize the carrier frequency so that the carrier frequency deviation Δf becomes an integer multiple of fs. The carrier frequency deviation signal is supplied to a carrier frequency control circuit 62.

Figure 15:
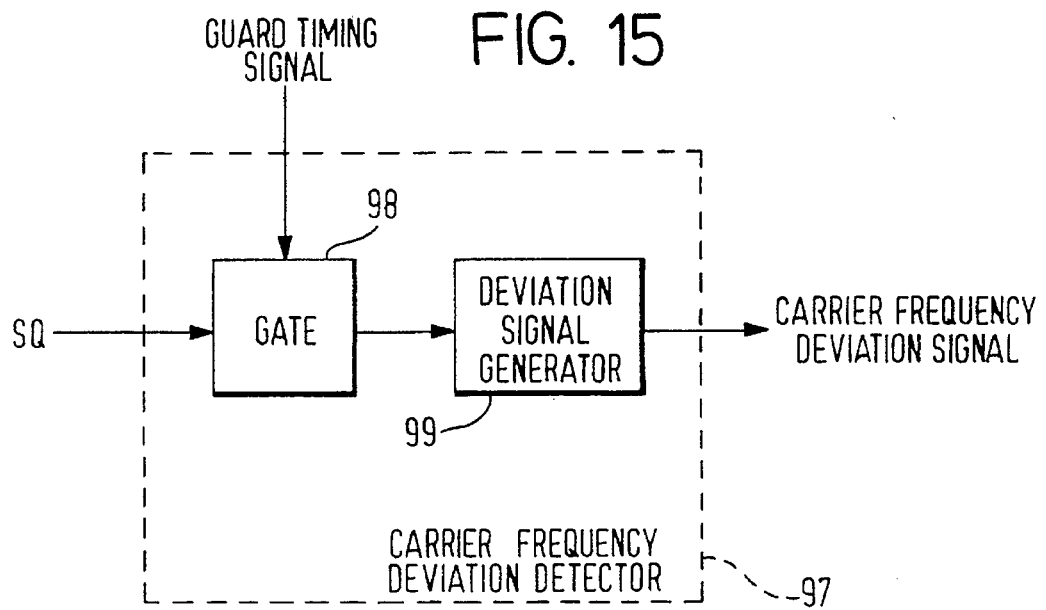
FIG. 15 is a block diagram showing another example of the carrier frequency deviation detection circuit.

FIG. 15 is a block diagram showing another example of the carrier frequency deviation detection circuit.

The correlation coefficient SQ is input to a gate 98 of a carrier frequency deviation detection circuit 97. The gate 98 outputs the correlation coefficient SQ to a frequency deviation signal generation circuit 99 based on the timing of the guard timing signal. As shown in FIG. 14(b), the correlation coefficient SQ at the guard timing will become zero (0) if the carrier frequency deviation Δf is integer multiples of fs. Therefore, the effect shown in FIG. 13 can be obtained when the frequency deviation signal generation circuit 99 uses a signal such as that shown in FIG. 14(b) as a carrier frequency deviation signal.

While a signal for adjusting the carrier frequency deviation Δf to a integer multiple of fs is obtained from the carrier frequency deviation detection circuit 61 as described above, a signal for controlling frequency deviation in units of fs is obtained from the output of the parallel/serial conversion circuit 44. The output of the parallel/serial conversion circuit 44 is supplied to a carrier frequency deviation detection circuit 101 and a carrier phase deviation detection circuit 102. The carrier frequency deviation detection circuit 101 detects frequency deviation of restored carrier by analyzing frequency of each sub-carrier power. In general, maximum and minimum frequency sub-carriers out of OFDM modulated signal sub-carriers are made as guard bands. They are not used for that reason (zero carrier). The carrier frequency deviation detection circuit 101 detects deviation of restored carriers by obtaining the zero carrier position from the result of power analysis performed on sub-carriers. For instance, if restored carrier (local oscillation output) frequency is deviated by fs (carrier frequency deviation Δf=fs), subcarrier power of minimum frequency becomes extremely small. Therefore, restored carrier frequency is made to coincide with carrier frequency at a unit of fs by detecting frequency deviation at that unit of fs through investigation of subcarrier power at both ends.

The output of the carrier frequency deviation detection circuit 101 is supplied to the carrier frequency control circuit 62. The carrier frequency control circuit 62 generates a control signal for controlling oscillation frequency of the local oscillator 35 based on the output of the carrier frequency deviation detection circuit 101, and a carrier frequency deviation signal based on the carrier frequency deviation detection circuit 61. The carrier frequency deviation detection circuit outputs the generated control signal to an adder 104.

The carrier phase deviation detection circuit 102 detects a phase deviation of restored carriers from out of phase sub-carriers, and outputs a phase deviation signal to a carrier phase control circuit 103. The carrier phase control circuit 103 generates a control signal for controlling the oscillation phase of the local oscillator 35 based on the phase deviation signal, and outputs the control signal to the adder 104. The adder 104 adds up the output of the carrier frequency control circuit 62 and the output of the carrier phase control circuit 103, and outputs the added result to a D/A converter 105. The D/A converter 105 converts the output of the adder 104 into an analog signal, and outputs the analog signal as a control signal for the local oscillator 35. The oscillation frequency of the local oscillator 35 is controlled based on the output of the D/A converter 105 to attain carrier synchronization.

The output of the parallel/serial conversion circuit 44 is supplied to a clock deviation detection circuit 106. The clock deviation from a difference of phase deviations among sub-carriers, and outputs a clock deviation signal to a clock control circuit 107. The clock control circuit 107 generates a clock control signal based on the clock deviation signal, and outputs it to a D/A converter 108. The D/A converter 108 converts the clock control signal into an analog signal, and outputs it to a local oscillator 109. The oscillation frequency of the local oscillator 109 is controlled by the output of the D/A converter 108. Thus, the clock synchronization is attained. Further, the oscillation clock of the local oscillator 109 is supplied to a timing sequencer 110 which in turn generates various timing signals.

Next, the operation of the embodiment in the structure described above will be explained.

The OFDM modulated signal transmitted through a transmission line (not shown) is received by a tuner (not shown). It is then converted into the IF signal and supplied to the BPF 32 via the input terminal 31. The BPF 32 outputs the IF signal to the multipliers 33, 34 after removing noise. The multipliers 33, 34 receive and orthogonally demodulate the I-axis restored carriers or the Q-axis restored carriers, respectively. The I-signal from the multiplier 33 is supplied to the A/D converter 38 via the LPF 37, and the Q-signal from the multiplier 34 is supplied to the A/D converter 40 via the LPF 39. The A/D converters 38, 40 convert the I-signal and the Q-signal into digital signals using clocks from the local oscillator 109. The converted signals are to the guard period removing circuit 41 of the OFDM demodulation block 45.

In this embodiment, the symbol synchronization for removing the guard period is attained from the OFDM modulated signal. That is, the I-signal and the Q=signal from the A/D converters 38, 40 are supplied to the delaying circuits 51, 52, respectively, and delayed by the available symbol period. Then, as shown in FIGS. 6(a) and 6(b), the guard periods G1, G2, . . . of the delayed signal of the I-signal and the Q-signal coincide with the timings of the terminating periods G1', G2', . . . of the I-signal. If the carrier synchronization has been attained, the I-signal and its delayed signal are mutually related to each other during the period. The correlator 53 obtains a correlation coefficient SI based on a correlation between the I-signal and its delayed signal, and outputs the correlation coefficient to the guard timing detection circuit 55.

Even when no carrier synchronization is attained, there is a correlation between the I-signal and its delayed signal or the I-signal and the delayed signal of the Q-signal during the terminating period as shown in FIGS. 7(a) through 9(b). The correlator 54 obtains a correlation coefficient SQ between the I-signal and the delayed signal of the Q-signal, and outputs that coefficient SQ to the guard timing detection 55. The guard timing detection circuit 55 adds up squares of the correlation coefficients SI and SQ, generates a guard timing signal at the peak position of the added result, and outputs that guard timing signal. As shown in FIG. 10, the peak position is generated at the end timing of each terminating period. The guard period removing circuit 41 removes the guard period using the guard timing signal. Thus, the symbol synchronization is attained.

The OFDM modulated signal with the guard period removed has only the available symbol period extracted. It is supplied to the serial/parallel conversion circuit 42 where it is converted into parallel data. The FFT circuit 43 performs the FFT process on the parallel conversion signals of the I-signal and the Q-signal, those signals being regarded as the real part and the imaginary part of the complex form signal, respectively. As a result, the I-data and the Q-data, which are demodulated symbols of sub-carriers, are output from the FFT circuit 43. These demodulated symbol data are converted into serial data in the parallel/serial converter 44, and the second data is output.

The correlation coefficients SI, SQ from the correlators 53, 54 are supplied to the carrier frequency deviation detection circuit 61. The carrier frequency deviation detection circuit 61 takes in the correlation coefficients SI, SQ at the guard timing and obtains an arc tangent of SQ/SI. As shown in FIGS. 14(a), 14(b) and 14(c), the correlation coefficients SI, SQ at the guard timing are functions of the carrier frequency deviation Δf. Arc tangents of SQ/SI become signals which 0 cross at the integer multiple position of fs. Using the signal, it is possible to control restored carrier frequency so that the carrier frequency deviation Δf becomes integer multiple of fs. The carrier frequency deviation detection circuit 61 outputs the signal to the carrier frequency control circuit 62 as a carrier frequency deviation signal.

The carrier frequency control circuit 61 generates a control signal for controlling oscillation frequency of the local oscillator 35 based on the output of the carrier frequency deviation detection circuit 101 and the carrier frequency deviation signal, the control signal being output to the adder 104. Further, the carrier phase deviation detection circuit 102 detects a phase deviation of restored carrier based on the phase deviation of sub-carrier. The carrier phase control circuit 103 generates a control signal for controlling the local oscillator 35 based on the phase deviation, that control signal being supplied to the adder 104. The output of the carrier frequency control circuit 62 and the output of the carrier phase control circuit 103 are added by the adder 104, converted into an analog signal by the D/A converter 105, and supplied to the local oscillator 35. Thus, the oscillation of the local oscillator 35 is controlled, and the carrier synchronization is attained.

Further, the output of the parallel/serial conversion circuit 44 is supplied to the carrier frequency deviation detection circuit 101 and the carrier phase deviation detection circuit 102. The frequency of sub-carrier power is analyzed by the carrier frequency deviation detection circuit 101, and a signal for controlling restored carrier frequency in unit of fs is supplied to the carrier frequency control circuit 62.

The clock synchronization and the carrier synchronization are attained using the output of the parallel/serial conversion circuit 44. That is, the output of the parallel/serial conversion circuit 44 is supplied to the clock deviation detection circuit 106 to obtain a clock deviation signal based on a difference of phase deviations of sub-carriers. The clock control circuit 107 generates a clock control signal based on the clock deviation signal, the clock control signal being used to control the oscillation of an imaginary part oscillator 109. The clock synchronization is thus attained.

As described above, in this embodiment the symbol synchronization is attained by obtaining a guard timing from the result of correlation between the orthogonal demodulated output and its delayed signal utilizing a signal in the guard period is a copied signal of that in the end period of the available symbol period. In addition, because the relationship between the correlation of the orthogonal demodulated output with its delayed signal and the carrier frequency deviation changes at the cycle of carrier interval fs, restored carrier frequency may be adjusted to accurately coincide with carrier frequency. An appropriate adjustment may be made by controlling restored carrier frequency based on the result of correlation, and by controlling deviation in unit of fs based on sub-carrier power of the FFT demodulated output. Thus, the symbol synchronization and the carrier synchronization are attained based on information derived from the signal alone to attain the positive symbol and the carrier synchronizations without using a special reference signal or a pilot carrier and to achieve the OFDM demodulation durable against disturbance.

Further, although the correlation coefficients SI, SQ represent the correlation between the I-signal and its delayed signal and the correlation between the I-signal and the delayed signal of the Q-signal, respectively, the correlation between the Q-signal and its delayed signal may be used as the correlation coefficient SI. In addition, the correlation between the Q-signal and the delayed signal of the I-signal may be used as the correlation coefficient SQ. Further, the correlation coefficients SI and SQ can be combined freely as desired.

As described above, the present invention can provide an extremely preferable OFDM synchronization demodulation circuit.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. An OFDM synchronization demodulation circuit comprising:

receiving means for receiving an orthogonal frequency division multiplex (OFDM) modulated signal having an available symbol period and a guard period, the guard period of the received modulated signal being based on a part of the available symbol period;

orthogonal axes demodulation means for demodulating an in-phase axis detection signal and an orthogonal axis detection signal of the received OFDM modulated signal;

first delaying means for delaying the in-phase axis detection signal by the available symbol period such that a guard period of the delayed in-phase axis detection signal coincides with a part of the available symbol period of the in-phase axis detection signal;

second delaying means for delaying the orthogonal axis detection signal by the available symbol period such that a guard period of the delayed orthogonal axis detection signal coincides with a part of the available symbol period of the orthogonal axis detection signal;

correlation calculation means for calculating correlation coefficients based on correlations of at least one of the in-phase axis detection signal and the orthogonal axis detection signal both with an output of the first delaying means and with an output of the second delaying means, respectively;

guard timing detection means for generating a timing signal that is characteristic of the guard period and that is based on the correlation coefficients; and OFDM signal demodulation means for demodulating the OFDM modulated signal by extracting only the available symbol period signal from the demodulated in-phase axis detection signal and the orthogonal axis detection signal based on the timing signal.

2. An OFDM synchronization demodulation circuit as claimed in claim 1, wherein the guard timing detection means produces a first square signal by squaring a first one of the correlation coefficients from the correlation calculation means of at least one of the in-phase axis detection signal with the output of the first delay means and the orthogonal axis detection signal with the output of the second delaying means, and produces a second square signal by squaring a second one of the correlation coefficients from the correlation calculation means of at least one of the in-phase axis detection signal with the output of the second delaying means and the orthogonal axis detection signal with the output of the first delaying means, and generates the timing signal by adding the first square signal and the second square signal.

3. An OFDM synchronization demodulation circuit as claimed in claim 1, wherein the guard timing detection means generates the timing signal by calculating an absolute value of one of the correlation coefficients from the correlation calculation means of at least one of the in-phase axis detection signal with the output of the first delaying means and the orthogonal axis detection signal with the output of the second delaying means, by calculating an absolute value of one of the correlation coefficients from the correlation calculation means of at least one of the in-phase axis detection signal with the output of the second delaying means and the orthogonal axis detection signal with the output of the first delaying means, and by adding the absolute values.

4. An OFDM synchronization demodulation circuit comprising:

receiving means for receiving an orthogonal frequency division multiplex (OFDM) modulated signal having an available symbol period and a guard period, the guard period of the received modulated signal being based on a part of the available symbol period;

orthogonal axes demodulation means for demodulating an in-phase axis detection signal and an orthogonal axis detection signal of the received OFDM modulated signal;

first delaying means for delaying the in-phase axis detection signal by the available symbol period such that a guard period of the delayed in-phase axis detection signal coincides with a part of the available symbol period of the in-phase axis detection signal;

second delaying means for delaying the orthogonal axis detection signal by the available symbol period such that a guard period of the delayed orthogonal axis detection signal coincides with a part of the available symbol period of the orthogonal axis detection signal;

correlation calculation means for calculating correlation coefficients based on correlations of at least one of the in-phase axis detection signal and the orthogonal axis detection signal both with an output of the first delaying means and with an output of the second delaying means, respectively;

OFDM signal demodulation means for demodulating the OFDM modulated signal by extracting only the available symbol period signal from the in-phase axis detection signal and the orthogonal axis detection signal;

frequency deviation detection means for detecting a frequency deviation of the orthogonal axes demodulating means based on the correlation coefficients calculated by the correlation calculation means; and frequency control means for controlling a frequency of the orthogonal axes demodulating means based on the detected frequency deviation.

5. A method for demodulating an OFDM synchronization, comprising the steps of:

receiving an orthogonal frequency division multiplex (OFDM) modulated signal having an available symbol period and a guard period, the guard period being based on a part of the available symbol period;

demodulating an in-phase axis detection signal and an orthogonal axis detection signal of the received OFDM modulated signal;

delaying the in-phase axis detection signal by the available symbol period such that a guard period of the delayed in-phase axis detection signal coincides with a part of the available symbol period of the in-phase axis detection signal;

delaying the orthogonal axis detection signal by the available symbol period such that a guard period of the delayed orthogonal axis detection signal coincides with a part of the available symbol period of the orthogonal axis detection signal;

calculating correlation coefficients based on correlations of at least one of the in-phase axis detection signal and the orthogonal axis detection signal both with the delayed in-phase axis detection signal and with the delayed orthogonal axis detection signal, respectively;

detecting a timing of the guard period based on the correlation coefficients; and demodulating the OFDM modulated signal by extracting the available symbol period signal from the in-phase axis detection signal and the orthogonal axis detection signal based on the detected timing.

6. A method as claimed in claim 5, wherein a first square signal is produced by squaring a first one of the correlation coefficients of at least one of the in-phase axis detection signal with the delayed in-phase axis detection signal and the orthogonal axis detection signal with the delayed orthogonal axis detection signal, and a second square signal is produced by squaring a second one of the correlation coefficients of at least one of the in-phase axis detection signal with the delayed orthogonal axis detection signal and the orthogonal axis detection signal with the delayed in-phase axis detection signal, and the timing of the guard period is detected by adding the first square signal and the second square signal.

7. A method as claimed in claim 5, wherein the guard timing is detected by calculating an absolute value of one of the correlation coefficients of at least one of the in-phase axis detection signal with the delaying in-phase axis detection signal and the orthogonal axis detection signal with the delayed orthogonal axis detection signal, and by calculating and absolute value of one of the correlation coefficients of at least one of the in-phase axis detection signal with the delayed orthogonal axis detection signal and the orthogonal axis detection signal with the delayed in-phase axis detection signal, and by adding the absolute values.

8. A method for demodulating an OFDM synchronization, comprising the steps of:

receiving an orthogonal frequency division multiplex (OFDM) modulated signal having an available symbol period and a guard period, the guard period being based on a part of the available symbol period;

demodulating an in-phase axis detection signal and an orthogonal axis detection signal of the received OFDM modulated signal;

delaying the in-phase axis detection signal by the available symbol period such that a guard period of the delayed in-phase axis detection signal coincides with a part of the available symbol period of the in-phase axis detection signal;

delaying the orthogonal axis detection signal by the available symbol period such that a guard period of the delayed orthogonal axis detection signal coincides with a part of the available symbol period of the orthogonal axis detection signal;

calculating correlation coefficients based on correlations of at least one of the in-phase axis detection signal and the orthogonal axis detection signal both with the delayed in-phase axis detection signal and with the delayed orthogonal axis detection signal, respectively;

demodulating the OFDM modulated signal by extracting only the available symbol period signal from the in-phase axis detection signal and the orthogonal axis detection signal;

detecting a frequency deviation based on the calculated correlation coefficients; and controlling a frequency of the OFDM demodulated signal based on the detected frequency deviation.

* * * * *